United States Patent
Kato et al.

(10) Patent No.: US 10,669,398 B2
(45) Date of Patent: Jun. 2, 2020

(54) FLAME-RETARDANT RESIN COMPOSITION AND MOLDED RESIN OBJECT

(71) Applicant: ZEON CORPORATION, Chiyoda-ku, Tokyo (JP)

(72) Inventors: Ayako Kato, Tokyo (JP); Shinsuke Miyazawa, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/554,489

(22) PCT Filed: Mar. 8, 2016

(86) PCT No.: PCT/JP2016/057204
§ 371 (c)(1),
(2) Date: Aug. 30, 2017

(87) PCT Pub. No.: WO2016/143794
PCT Pub. Date: Sep. 15, 2016

(65) Prior Publication Data
US 2018/0044506 A1 Feb. 15, 2018

(30) Foreign Application Priority Data

Mar. 10, 2015 (JP) ................................ 2015-047536
Sep. 3, 2015 (JP) ................................ 2015-173816

(51) Int. Cl.
C08K 5/3417 (2006.01)
C08L 65/00 (2006.01)
C08K 5/3415 (2006.01)
C08L 25/18 (2006.01)

(52) U.S. Cl.
CPC .......... *C08K 5/3417* (2013.01); *C08K 5/3415* (2013.01); *C08L 25/18* (2013.01); *C08L 65/00* (2013.01); *C08G 2261/418* (2013.01); *C08G 2261/724* (2013.01); *C08K 2201/019* (2013.01); *C08L 2201/02* (2013.01)

(58) Field of Classification Search
None
See application file for complete search history.

(56) References Cited

U.S. PATENT DOCUMENTS

| 6,346,581 B1* | 2/2002 | Tsunogae ................ C08J 5/18 |
| | | 525/332.1 |
| 2003/0075270 A1 | 4/2003 | Landi et al. |
| 2007/0185290 A1* | 8/2007 | Hayano ................ C08G 61/06 |
| | | 526/172 |

FOREIGN PATENT DOCUMENTS

| CN | 103937156 A | 7/2014 |
| EP | 0205833 A1 | 12/1986 |
| JP | S51137752 A | 11/1976 |
| JP | H07179575 A | 7/1995 |
| JP | H11140282 A | 5/1999 |
| JP | 2010084043 A | 4/2010 |
| JP | 2010084045 A | 4/2010 |
| JP | 2014162811 A | 9/2014 |

OTHER PUBLICATIONS

Machine Translation of Fujita et al. (JP 2010-84043).*
Apr. 19, 2016, International Search Report issued in the International Patent Application No. PCT/JP2016/057204.
Laura R. Gilliom et al., Titanacyclobutanes Derived from Strained Cyclic Olefins: The Living Polymerization of Norbornene, J. Am. Chem. Soc., 1986, 108, p. 733.
Sonbinh T. Nguyen et al., Syntheses and Activities of New Single-Component, Ruthenium-Based Olefin Metathesis Catalysts, J. Am. Chem. Soc., 1993, 115, p. 9858.
Peter Schwab et al., Synthesis and Applications of RuCl2(=CHR')(PR3)2: The Influence of the Alkylidene Moiety on Metathesis Activity, J. Am. Chem. Soc., 1996, 118, p. 100.
Oct. 26, 2018, the Extended European Search Report issued by the European Patent Office in the corresponding European Patent Application No. 16761762.0.

* cited by examiner

*Primary Examiner* — Robert T Butcher
(74) *Attorney, Agent, or Firm* — Kenja IP Law PC

(57) ABSTRACT

The present invention is a flame-retardant resin composition comprising a cycloolefin-based polymer and a halogen-containing flame retardant selected from a group consisting of a halogenated bisimide compound and a halogen-containing styrene-based resin, and may be comprising a halogen-active species scavenger, wherein a content of the halogen-containing flame retardant is 10 to 80 parts by weight based on 100 parts by weight of the cycloolefin-based polymer, and a content of the halogen-active species scavenger is less than 25 parts by weight based on 100 parts by weight of the halogen-containing flame retardant, and a resin formed article. One aspect of the invention provides a flame-retardant resin composition having excellent flame retardance, low dielectric constant and low dielectric loss tangent, and a resin formed article produced by forming this flame-retardant resin composition.

5 Claims, No Drawings

FLAME-RETARDANT RESIN COMPOSITION AND MOLDED RESIN OBJECT

TECHNICAL FIELD

The present invention relates to a flame-retardant resin composition having excellent flame retardance and low dielectric constant and low dielectric loss tangent, and a resin formed article produced by forming this flame-retardant resin composition.

BACKGROUND ART

Conventionally, cycloolefin-based polymers have been broadly utilized as forming materials or the like, since they exhibit excellent transparency, low hygroscopicity, excellent heat resistance, excellent insulation property, excellent chemical resistance, excellent impact resistance and the like. However, the above properties inherent in the cycloolefin-based polymer were sometimes impaired when a resin composition was prepared by adding a flame retardant in order to improve the flame retardance of the resin composition including the cycloolefin-based polymer.

As a resin composition capable of solving this problem, Patent Literature 1 describes a flame-retardant resin composition including a particular norbornene-based polymer and a halogen-containing flame retardant. This resin composition is considered to maintain mechanical strength and chemical resistance inherent in the norbornene-based polymer and have excellent flame retardance.

However, as the resin composition described in Patent Literature 1, when a resin composition including a norbornene-based polymer and a halogen-containing flame retardant was used as a forming material for a circuit board such as a printed wiring board, the dielectric constant and the dielectric loss tangent were increased in some cases, and thus the resin composition was not necessarily suitable as a forming material for a high-frequency circuit board.

Thus, a flame-retardant resin composition having excellent flame retardance, and low dielectric constant and low dielectric loss tangent, has been required.

CITATION LIST

Patent Literature

Patent Literature 1: JP-A-H11-140282

SUMMARY OF INVENTION

Technical Problem

The present invention was made in view of the above circumstances, and the object of the present invention is to provide a flame-retardant resin composition having excellent flame retardance, low dielectric constant and low dielectric loss tangent, and to provide a resin formed article produced by forming this flame-retardant resin composition.

Solution to Problem

In order to solve the above problem, the inventors conducted extensive studies with regard to a resin composition that includes a cycloolefin-based polymer and a halogen-containing flame retardant. As a result, the inventors found that a resin composition including a cycloolefin-based polymer and a particular halogen-containing flame retardant, in which the content of the halogen-containing flame retardant was within a particular range and the content of the halogen-active species scavenger was a particular amount or less, had excellent flame retardance, low dielectric constant and low dielectric loss tangent, and completed the present invention.

One aspect of the invention provides the following flame-retardant resin compositions [1] to [4] and a resin formed article [5].

[1] A flame-retardant resin composition including a cycloolefin-based polymer and a halogen-containing flame retardant selected from a group consisting of a halogenated bisimide compound and a halogen-containing styrene-based resin, and may be including a halogen-active species scavenger, wherein a content of the halogen-containing flame retardant is 10 to 80 parts by weight based on 100 parts by weight of the cycloolefin-based polymer, and a content of the halogen-active species scavenger is less than 25 parts by weight based on 100 parts by weight of the halogen-containing flame retardant.

[2] The flame-retardant resin composition according to [1], wherein the halogen-active species scavenger is an inorganic halogen-active species scavenger.

[3] The flame-retardant resin composition according to [1] or [2], wherein a dielectric constant is 3.0 or lower, and a dielectric loss tangent is lower than $5.0 \times 10^{-3}$, at a frequency of 1 GHz.

[4] The flame-retardant resin composition according to [1] or [2], wherein a dielectric constant is 3.0 or lower, and a dielectric loss tangent is lower than $1.0 \times 10^{-3}$, at a frequency of 1 GHz.

[5] A resin formed article produced by forming the flame-retardant resin composition according to any of [1] to [4].

Advantageous Effects of Invention

One aspect of the invention provides a flame-retardant resin composition having excellent flame retardance, low dielectric constant and low dielectric loss tangent, and a resin formed article produced by forming this flame-retardant resin composition.

DESCRIPTION OF EMBODIMENTS

Hereinafter, the embodiments of the present invention are classified into 1) flame-retardant resin composition and 2) resin formed article, and described in detail.

1) Flame-Retardant Resin Composition

The flame-retardant resin composition according to one embodiment of the invention is a flame-retardant resin composition includes a cycloolefin-based polymer and a halogen-containing flame retardant selected from a group consisting of a halogenated bisimide compound and a halogen-containing styrene-based resin, and may include a halogen-active species scavenger, wherein a content of the halogen-containing flame retardant is 10 to 80 parts by weight based on 100 parts by weight of the cycloolefin-based polymer, and a content of the halogen-active species scavenger is less than 25 parts by weight based on 100 parts by weight of the halogen-containing flame retardant.

[Cycloolefin-Based Polymer]

The cycloolefin-based polymer used in the present invention is a polymer having a structure obtained by polymerizing a cycloolefin-based monomer.

The cycloolefin-based monomer is a compound having a ring structure formed by carbon atoms and having a polymerizable carbon-carbon double bond in the ring structure.

Examples of the polymerizable carbon-carbon double bond include a carbon-carbon double bond capable of ring-opening (co)polymerization and a carbon-carbon double bond capable of addition (co)polymerization. Further, examples of the ring structure of the cycloolefin-based monomer include a monocyclic ring, a polycyclic ring, a fused polycyclic ring, a crosslinked ring, combinations thereof, and the like.

Among them, from the viewpoint of highly balancing the properties such as dielectric property and heat resistance of the obtained polymer, a cycloolefin-based monomer having any ring structure selected from the polycyclic ring, the fused polycyclic ring, the crosslinked ring, and the combinations thereof (hereinafter whole of them is collectively referred to as "polycyclic cycloolefin-based monomer" in some cases) is preferred.

Examples of the cycloolefin-based polymer used in the present invention include a cycloolefin-based ring-opening polymer (I) obtained by ring-opening polymerization of a polycyclic cycloolefin-based monomer, and a hydrogenated product thereof; a cycloolefin-based addition polymer (II) obtained by addition polymerization of a polycyclic cycloolefin-based monomer, and a hydrogenated product thereof; a monocyclic cycloolefin-based polymer (III) obtained by polymerizing a monocyclic cycloolefin-based monomer; a cyclic conjugated diene-based polymer (IV) obtained by polymerizing a cyclic conjugated diene-based monomer; a vinyl alicyclic hydrocarbon-based polymer (V); and the like.

Among them, from the viewpoint of highly balancing the properties such as dielectric property and heat resistance of the obtained polymer, the cycloolefin-based ring-opening polymer (I) and its hydrogenated product, and the cycloolefin-based addition polymer (II) and its hydrogenated product are preferable, the hydrogenated product of the cycloolefin-based ring-opening polymer (I) and the cycloolefin-based addition polymer (II) are more preferable, and the hydrogenated product of the cycloolefin-based ring-opening polymer (I) is particularly preferable.

[Cycloolefin-Based Ring-Opening Polymer (I)]

As the cycloolefin-based ring-opening polymer (I), a norbornene-based ring-opening polymer is preferable.

Examples of the norbornene-based ring-opening polymer include a ring-opening homopolymer of a norbornene-based monomer, a ring-opening copolymer of two or more of norbornene-based monomers, and a ring-opening copolymer of the norbornene-based monomer and other monomer.

When the cycloolefin-based ring-opening polymer is a copolymer, such a copolymer may a block copolymer or a random copolymer.

A norbornene-based monomer is a monomer including a norbornene ring structure in its molecule.

Examples of the norbornene-based monomer include a compound represented by the following formula (1):

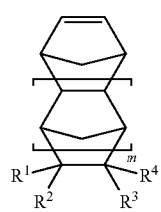

(1)

In the formula (1), each of $R^1$ to $R^4$ independently represents hydrogen atom; a halogen atom; a hydrocarbon group having 1 to 20 carbon atoms that may have a substituent; or a substituent including silicon atom, oxygen atom or nitrogen atom. Two groups selected from $R^1$ to $R^4$ may bind to each other to form a ring. m is 0, 1 or 2.

Examples of the halogen atoms of $R^1$ to $R^4$ include fluorine atom, chlorine atom, bromine atom and the like.

Examples of the hydrocarbon group of the hydrocarbon group having 1 to 20 carbon atoms which may have a substituent of $R^1$ to $R^4$ include an alkyl group such as a methyl group, an ethyl group, a n-propyl group, an isopropyl group, a n-butyl group, an isobutyl group, a s-butyl group, a t-butyl group, a n-pentyl group, an isopentyl group, a n-hexyl group, a n-heptyl group, a n-octyl group, a n-nonyl group and a n-decyl group; a cycloalkyl group such as a cyclopropyl group, a cyclobutyl group, a cyclopentyl group, a cyclohexyl group and a cycloheptyl group; an alkenyl group such as a vinyl group, a 1-propenyl group, an allyl group, a 1-butenyl group, a 2-butenyl group, a pentenyl group, a hexenyl group and a cyclohexenyl group; an alkynyl such as an ethynyl group, a 1-propynyl group, a 2-propynyl (propargyl) group, a 3-butynyl group, a pentynyl group and a hexynyl group; an aryl group such as a phenyl group, a tolyl group, a xylyl group, a biphenylyl group, a 1-naphthyl group, a 2-naphthyl group, an anthryl group and a phenanthryl group; an aralkyl group such as a benzyl group and a phenethyl group; and the like.

Examples of these substituents include a halogen atom such as fluorine atom and chlorine atom; an alkoxy group such as a methoxy group and an ethoxy group; and the like.

Specific examples of the norbornene-based monomer include a bicyclic monomer such as bicyclo[2.2.1]hept-2-ene (trivial name: norbornene), 5-ethylidene-bicyclo[2.2.1]hept-2-ene (trivial name: ethylidene norbornene) and derivatives thereof (those having a substituent on the ring);

a tricyclic monomer such as tricyclo[4.3.0$^{1,6}$.1$^{2,5}$]deca-3,7-diene (trivial name: dicyclopentadiene) and derivatives thereof;

a tetracyclic monomer such as 7,8-benzotricyclo[4.3.0.1$^{2,5}$]deca-3-ene (trivial name: also referred to as methanotetrahydrofluorene: 1,4-methano-1,4,4a, 9a-tetrahydrofluorene in some cases) and derivatives thereof, tetracyclo[4.4.0.1$^{2,5}$.1$^{7,10}$]dodeca-3-ene (trivial name: tetracyclododecene), 8-ethylidenetetracyclo[4.4.0.1$^{25}$.1$^{7,1}$]-3-dodecene and derivatives thereof; and the like.

These norbornene-based monomers may be used either alone or in combination.

Examples of other monomers capable of ring-opening copolymerization with the norbornene-based polymer include a monocyclic cycloolefin-based monomer such as; a cyclic monoolefin such as cyclobutene, cyclopentene, cyclohexene, cycloheptene and cyclooctene, and derivatives thereof; a cyclic diolefin such as cyclohexadiene and cyclooctadiene, and derivatives thereof.

These monocyclic cycloolefin-based monomers may have a substituent. Examples of such a substituent include an alkyl group such as a methyl group and an ethyl group; an alkenyl group such as a vinyl group; an alkylidene group such as a propan-2-ylidene group; an aryl group such as a phenyl group; a hydroxy group; an acid anhydride group; a carboxyl group; an alkoxycarbonyl group such as a methoxycarbonyl group; and the like. The monocyclic cycloolefin-based monomers may be used either alone or in combination.

The amount of the monocyclic cycloolefin-based monomer to be used is not particularly limited, but is preferably 20 wt % or less, more preferably 10 wt % or less based on the whole cycloolefin-based monomer, and even more preferably the monomer is not used.

The cycloolefin-based ring-opening polymer (I) can be synthesized according to a known method using a metathesis polymerization catalyst.

The metathesis polymerization catalyst is not particularly limited, and a known catalyst is used. Examples of the metathesis polymerization catalyst include a catalyst system that includes a halide, a nitrate or an acetylacetone compound of a metal selected from ruthenium, rhodium, palladium, osmium, iridium, platinum and the like, and a reducing agent; a catalyst system that includes a halide or an acetylacetone compound of a metal selected from titanium, vanadium, zirconium, tungsten and molybdenum, and an organoaluminum compound as a promoter; a Schrock-type or Grubbs-type living ring-opening metathesis polymerization catalyst (see JP-A-H7-179575, J. Am. Chem. Soc., 1986, 108, p. 733, J. Am. Chem. Soc., 1993, 115, p. 9858, and J. Am. Chem. Soc., 1996, 118, p. 100); and the like.

These metathesis polymerization catalysts may be used either alone or in combination. The amount of the metathesis polymerization catalyst to be used may be appropriately selected depending on the polymerization conditions and the like, but is normally 0.000001 to 0.1 mol, and preferably 0.00001 to 0.01 mol based on 1 mol of the cycloolefin-based monomer.

A linear α-olefin having 4 to 40 carbon atoms such as 1-butene, 1-hexene and 1-decene may be used as a molecular weight modifier when subjecting the cycloolefin-based monomer to ring-opening polymerization.

The amount of the linear α-olefin to be added is normally 0.001 to 0.030 mol, preferably 0.003 to 0.020 mol, and more preferably 0.005 to 0.015 mol based on 1 mol of the cycloolefin-based monomer.

The cycloolefin-based monomer can be subjected to ring-opening polymerization in an organic solvent. The organic solvent is not particularly limited as long as the organic solvent is inert to the polymerization reaction. Examples of the organic solvent include an aromatic hydrocarbon-based solvent such as benzene, toluene and xylene; an aliphatic hydrocarbon-based solvent such as n-pentane, n-hexane and n-heptane; an alicyclic hydrocarbon-based solvent such as cyclohexane, methylcyclohexane, decalin and bicyclononane; a halogenated hydrocarbon-based solvent such as dichloroethane, chlorobenzene, dichlorobenzene and trichlorobenzene; and the like.

The polymerization temperature is not particularly limited, but is normally −50 to 250° C., preferably −30 to 200° C., and more preferably −20 to 150° C. The polymerization time is appropriately selected taking account of the polymerization conditions, but is normally 30 minutes to 20 hours, and preferably 1 to 10 hours.

The weight average molecular weight (Mw) of the cycloolefin-based ring-opening polymer (I) is not particularly limited, but is preferably 15,000 to 150,000, more preferably 20,000 to 100,000, and even more preferably 23,000 to 50,000.

The molecular weight distribution (Mw/Mn) of the cycloolefin-based ring-opening polymer (I) is not particularly limited, but is preferably 1 to 5, and more preferably 1 to 4.

When the weight average molecular weight and the molecular weight distribution of the cycloolefin-based ring-opening polymer (I) are within the above range, a resin formed article having sufficient mechanical strength is easily obtained.

The weight average molecular weight (Mw) and the number average molecular weight (Mn) of the cycloolefin-based ring-opening polymer (I) refer to standard polystylene-equivalent values determined by gel permeation chromatography (GPC) using tetrahydrofuran as a developing solvent.

Since tacticity is normally maintained in the hydrogenation reaction as described below, a hydrogenated product of the crystalline cycloolefin-based ring-opening polymer (I) can be efficiently obtained by subjecting the crystalline cycloolefin-based ring-opening polymer (I) to a hydrogenation reaction. The hydrogenated product of the crystalline cycloolefin-based ring-opening polymer (I) has excellent heat resistance and chemical resistance. In addition, the hydrogenated product of the crystalline cycloolefin-based ring-opening polymer (I) shows a remarkable reinforcing effect when used in combination with a reinforcing material, and considerably improves the mechanical strength and the heat resistance in combination with the reinforcing material. Because of these properties, the flame-retardant resin composition including the hydrogenated product of the crystalline cycloolefin-based ring-opening polymer is suitable as a forming material for electric/electronic parts.

Herein, "crystalline cycloolefin-based ring-opening polymer" and "hydrogenated product of the crystalline cycloolefin-based ring-opening polymer" are respectively a polymer of which the melting point is observed when measured by the differential scanning colorimetry.

When the crystalline cycloolefin-based ring-opening polymer (I) is synthesized, the norbornene-based monomer to be used is preferably dicyclopentadiene. The amount of dicyclopentadiene to be used is preferably 50 wt % or more, more preferably 80 wt % or more, and even more preferably 100 wt % based on the whole cycloolefin-based monomer.

In addition, some norbornene-based monomers include endo and exo stereoisomers, and it is preferable that the rate of the one stereoisomer is increased when synthesizing the crystalline cycloolefin-based ring-opening polymer (I). For example, the rate of the endo or exo stereoisomer is preferably 80% or higher, more preferably 90% or higher, and particularly preferably 95% or higher. Note that, from the viewpoint of easiness of synthesis, the stereoisomer of which the ratio is increased, is preferably the endo stereoisomer.

The crystalline cycloolefin-based ring-opening polymer (I) can be synthesized e.g. in accordance with the method described in JP-A-2014-162811.

[Hydrogenated Product of Cycloolefin-Based Ring-Opening Polymer (I)]

The cycloolefin-based ring-opening polymer (I) obtained by the above method is subjected to hydrogenation reaction (hydrogenation reaction of the main-chain double bond) to obtain a hydrogenated product of the cycloolefin-based ring-opening polymer (I). As a polymer component, the hydrogenated cycloolefin-based ring-opening polymer can be used to efficiently obtain a flame-retardant resin composition having a low dielectric constant.

The cycloolefin-based ring-opening polymer (I) can be hydrogenated by bringing a polymer (α) or a polymer (β) into contact with hydrogen in the presence of a hydrogenation catalyst in accordance with an ordinary method.

The hydrogenation catalyst may be a homogeneous catalyst, or may be a heterogeneous catalyst.

A homogeneous catalyst has an advantage in that it is easily dispersed in a hydrogenation reaction solution, and thus the amount of catalyst to be added can be reduced. Further, since the homogeneous catalyst exhibits sufficient activity even when the temperature and the pressure are not increased, decomposition and gelation of the polymer (α), the polymer (β) and a polymer (γ) do not easily occur. Thus, a homogeneous catalyst is preferably used from the viewpoint of cost and the quality of the product.

On the other hand, a heterogeneous catalyst has an advantage in that it exhibits particularly excellent activity at a high temperature and a high pressure, and thus the polymer (α) and the polymer (β) can be hydrogenated within a short time. Moreover, a catalyst residue can be easily removed after completion of the hydrogenation reaction. Thereby, a heterogeneous catalyst is preferably used from the viewpoint of production efficiency.

Examples of the homogeneous catalyst include a Wilkinson's complex [chlorotris(triphenylphosphine)rhodium(I)]; a catalyst that includes a combination of a transition metal compound and an alkylmetal compound, such as combinations of cobalt acetate/triethylaluminum, nickel acetylacetonate/triisobutylaluminum, titanocene dichloride/n-butyllithium, zirconocene dichloride/sec-butyllithium and tetrabutoxytitanate/dimethylmagnesium; and the like.

Examples of the heterogeneous catalyst include a catalyst in which a metal such as Ni, Pd, Pt, Ru, and Rh is supported on a support. Particularly, when the amount of impurities in the resulting hydrogenated product is reduced, it is preferable to use an adsorbent such as alumina and diatomaceous earth as the support.

The hydrogenation reaction is normally effected in an organic solvent. The organic solvent is not particularly limited as long as the organic solvent is inert to the hydrogenation reaction. As the organic solvent, a hydrocarbon-based solvent is normally used because a hydrocarbon-based solvent can easily dissolve the polymer (γ). Examples of the hydrocarbon-based solvent include an aromatic hydrocarbon-based solvent such as benzene, toluene and xylene; an aliphatic hydrocarbon-based solvent such as n-pentane, n-hexane and n-heptane; an alicyclic hydrocarbon-based solvent such as cyclohexane, methylcyclohexane, decalin and bicyclononane; and the like.

These organic solvents may be used either alone or in combination of two or more kinds. In addition, a solvent that is used for a ring-opening polymerization reaction is normally also suitable as a solvent for a hydrogenation reaction. Therefore, after the hydrogenation catalyst is added to the ring-opening polymerization reaction mixture, the resulting mixture can be subjected to the hydrogenation reaction.

The hydrogenation reaction can be effected in accordance with ordinary method.

The hydrogenation ratio varies depending on the type of hydrogenation catalyst and the reaction temperature. Thus, when the polymer (α) or the polymer (β) includes an aromatic ring, the residual ratio of the aromatic ring can be controlled by selection of the hydrogenation catalyst, adjustment of the reaction temperature, or the like. For example, the unsaturated bonds of an aromatic ring can be allowed to remain to a certain extent or higher by controls such as lowering of the reaction temperature and the hydrogen pressure, and reduction of the reaction time.

After completion of the hydrogenation reaction, the reaction mixture can be subjected to a treatment such as centrifugation, or filtration to remove a catalyst residue. In addition, a catalyst deactivation agent such as water and alcohol may be used, or an adsorbent such as activated clay and alumina may be added, as required.

The weight average molecular weight (Mw) of the hydrogenated product of the cycloolefin-based ring-opening polymer (I) is not particularly limited, but is preferably 15,000 to 150,000, more preferably 20,000 to 100,000, and even more preferably 23,000 to 50,000.

The molecular weight distribution (Mw/Mn) of the hydrogenated product of the cycloolefin-based ring-opening polymer (I) is not particularly limited, but is preferably 1 to 5, and more preferably 1 to 4.

When the weight average molecular weight and the molecular weight distribution of the hydrogenated product of the cycloolefin-based ring-opening polymer (I) are within the above ranges, a resin formed article having sufficient mechanical strength can be easily obtained.

The weight average molecular weight (Mw) and the number average molecular weight (Mn) of the hydrogenated product of the cycloolefin-based ring-opening polymer (I) can be measured by the same way as described above.

In the hydrogenated product of the cycloolefin-based ring-opening polymer (I), the tacticity of the cycloolefin-based ring-opening polymer (I) subjected to the hydrogenation reaction is normally maintained. Thus, for example, when the cycloolefin-based ring-opening polymer (I) is a polymer having syndiotacticy, this is subjected to hydrogenation reaction to obtain a hydrogenated product of the cycloolefin-based ring-opening polymer (I) having the same tacticity.

A ratio of the racemo diads in the hydrogenated product of the cycloolefin-based ring-opening polymer (I) having syndiotacticity is not particularly limited, but is normally 55% or higher, preferably 60% or higher, more preferably 65 to 99% or higher, and particularly preferably 88 to 99%. Since the hydrogenated product of the cycloolefin-based ring-opening polymer (I) having the ratio of racemo diads within the above ranges has a higher crystallinity, this polymer can be used to obtain a flame-retardant resin composition having excellent heat resistance.

The ratio of the racemo diads in the hydrogenated product of the cycloolefin-based ring-opening polymer (I) can be quantitatively determined by measuring a $^{13}C$-NMR spectrum, on the basis of the spectral data. For example, $^{13}C$-NMR measurement can be carried out using a mixed solvent of 1,2,4-trichlorobenzene-d3/o-dichlorobenzene-d4 (volume ratio: 2/1) as a solvent at 200° C. to determine the ratio of the racemo diads from the intensity ratio between the signal at 43.35 ppm attributed to the meso diads and the signal at 43.43 ppm attributed to the racemo diads.

In the hydrogenated product of the crystalline cycloolefin-based ring-opening polymer (I), the temperature range of the melting point is not particularly limited, but is normally 200° C. or higher, and preferably 230 to 290° C.

The hydrogenated product of the cycloolefin-based ring-opening polymer (I) having such a melting point is more excellent in balance between formability and heat resistance. The melting point of the hydrogenated product of the cycloolefin-based ring-opening polymer (I) can be adjusted by adjustment of the degree of its syndiotacticity (the ratio of the racemo diads), selection of the type of monomer to be used, or the like.

[Cycloolefin-Based Addition Polymer (II)]

As the cycloolefin-based addition polymer (II), a norbornene-based addition polymer is preferable.

The norbornene-based addition polymer is a polymer obtained by subjecting a norbornene-based monomer to addition polymerization.

Examples of the norbornene-based addition polymer include an addition homopolymer of a norbornene-based monomer, an addition copolymer of two or more of a norbornene-based monomer, and an addition copolymer of the norbornene-based monomer and other monomer. When the cycloolefin addition polymer is a copolymer, this copolymer may be a block copolymer or a random copolymer.

Examples of the norbornene-based monomer used for producing the norbornene-based addition polymer include the same polymer as exemplified on the section of the norbornene-based ring-opening polymer (I).

Examples of another monomer capable of addition copolymerization with the norbornene-based monomer include an α-olefin having 2 to 20 carbon atoms such as ethylene, propylene and 1-butene, and derivatives thereof; a cycloolefin such as cyclobutene, cyclopentene and cyclohexene, and derivatives thereof; and a non-conjugated diene such as 1,4-hexadiene, 4-methyl-1,4-hexadiene and 5-methyl-1,4-hexadiene; and the like. Among them, the α-olefin is preferable, and ethylene is more preferable. In addition, another monomer capable of addition copolymerization with a monomer having a norbornene structure may be used alone, or two or more kinds thereof may be used in combination in an arbitrary ratio.

The weight average molecular weight (Mw) of the cycloolefin-based addition polymer (II) is not particularly limited, but is preferably 15,000 to 150,000, more preferably 20,000 to 100,000, and even more preferably 23,000 to 50,000.

The molecular weight distribution (Mw/Mn) of the cycloolefin-based addition polymer (II) is not particularly limited, but is preferably 1 to 5, more preferably 1 to 4.

When the weight average molecular weight and the molecular weight distribution of the cycloolefin-based addition polymer (II) are within the above ranges, a resin formed article having sufficient mechanical strength can be easily obtained.

The weight average molecular weight (Mw) and the number average molecular weight (Mn) of the cycloolefin-based addition polymer (II) can be measured by the same method as described above.

[Hydrogenated Product of Cycloolefin-Based Addition Polymer (II)]

Examples of the hydrogenated product of the cycloolefin-based addition polymer (II) include a hydrogenated product of an addition polymer of a norbornene-based monomer and a norbornene-based monomer capable of copolymerization therewith, a hydrogenated product of an addition copolymer of a norbornene-based monomer and another monomer capable of copolymerization therewith, and the like. These hydrogenated products can be produced by hydrogenating preferably 90% or more of carbon-carbon unsaturated bonds in a solution of the cycloolefin-based addition polymer (II) in the presence of a known hydrogenation catalyst including a transition metal such as nickel and palladium.

The weight average molecular weight (Mw) of the hydrogenated product of the cycloolefin-based addition polymer (II) is not particularly limited, but is preferably 15,000 to 150,000, more preferably 20,000 to 100,000, and even more preferably 23,000 to 50,000.

The molecular weight distribution (Mw/Mn) of the hydrogenated product of the cycloolefin-based addition polymer (II) is not particularly limited, but is preferably 1 to 5, and more preferably 1 to 4.

When the weight average molecular weight and the molecular weight distribution of the hydrogenated product of the cycloolefin-based addition polymer (II) are within the above ranges, a resin formed article having sufficient mechanical strength can be easily obtained.

The weight average molecular weight (Mw) and the number average molecular weight (Mn) of the hydrogenated product of the cycloolefin-based addition polymer (II) can be measured by the same way as described above.

[Monocyclic Cycloolefin-Based Polymer (III)]

Examples of the monocyclic cycloolefin-based polymer include an addition polymer of a monocyclic cycloolefin-based monomer. Examples of the monocyclic cycloolefin-based monomer include cyclohexene, cycloheptene, cyclooctene and the like.

The method for synthesizing the monocyclic olefin-based polymer (III) is not particularly limited, and a known method can be appropriately used.

[Cyclic Conjugated Diene-Based Polymer (IV)]

Examples of the cyclic conjugated diene-based polymer (IV) include a polymer obtained by cyclizing an addition polymer of a conjugated diene-based monomer, such as 1,3-butadiene, isoprene and chloroprene; a 1,2- or 1,4-addition polymer of a cyclic conjugated diene-based monomer, such as cyclopentadiene and cyclohexadiene; hydrogenated products thereof; and the like.

The method for synthesizing the cyclic conjugated diene-based polymer (IV) is not particularly limited, and a known method can be appropriately used.

[Vinyl Alicyclic Hydrocarbon-Based Polymer (V)]

Examples of the vinyl alicyclic hydrocarbon-based polymer (V) include a polymer of a vinyl alicyclic hydrocarbon-based monomer such as vinyl cyclohexene and vinyl cyclohexane, and a hydrogenated product thereof; a hydrogenated product of an aromatic ring portion in a polymer of a vinylaromatic monomer such as styrene and α-methylstyrene; and the like. In addition, the vinyl alicyclic hydrocarbon-based polymer (V) may be a copolymer of a vinyl alicyclic hydrocarbon-based monomer and a vinyl aromatic monomer with another monomer capable of copolymerization therewith. Examples of such a copolymer include a random copolymer, a block copolymer and the like.

The synthesis method of the vinyl alicyclic hydrocarbon-based polymer (V) is not particularly limited, and a known method can be appropriately used.

In the flame-retardant resin composition according to one embodiment of the invention, the cycloolefin-based polymers may be used either alone or in combination.

[Halogen-Containing Flame Retardant]

The halogen-containing flame retardant used in the present invention is a compound selected from the group consisting of a halogenated bisimide compound and a halogen-containing styrene-based resin (hereinafter referred to as "flame retardant (α)" in some cases).

In the present invention, a flame retardant (α) can be used to efficiently obtain a flame-retardant resin composition having excellent flame retardance and low dielectric constant and low dielectric loss tangent.

Examples of the halogenated bisimide compound include a compound represented by the following formula (2):

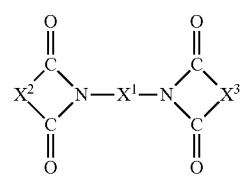

(2)

In the formula (2), $X^1$ represents a divalent organic group, and each of $X^2$ and $X^3$ independently represents a divalent organic group having halogen atom.

Examples of the divalent organic group of $X^1$ include groups represented by the following formulas (3a) to (3d):

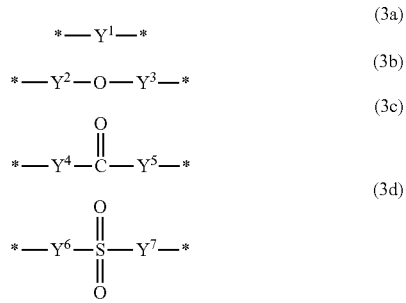

$$*—Y^1—* \quad (3a)$$
$$*—Y^2—O—Y^3—* \quad (3b)$$
$$*—Y^4—\overset{O}{\underset{\|}{C}}—Y^5—* \quad (3c)$$
$$*—Y^6—\overset{O}{\underset{\underset{O}{\|}}{S}}—Y^7—* \quad (3d)$$

Wherein, each of $Y^1$ to $Y^7$ independently represents an alkylene group having 1 to 10 carbon atoms or an arylene group having 6 to 20 carbon atoms. * represents a bonding hand.

Examples of the alkylene group having 1 to 10 carbon atoms include a methylene group, an ethylene group, a trimethylene group, a propylene group, and a tetramethylene group, and the like.

Examples of the arylene group having 6 to 20 carbon atoms include a 1,4-phenylene group, a 1,5-naphthylene group, a 1,7-naphthylene group, and the like.

Among them, the divalent organic group of $X^1$ is preferably an alkylene group having 1 to 10 carbon atoms, more preferably an alkylene group having 2 to 6 carbon atoms, and even more preferably an alkylene group having 2 to 4 carbon atoms.

Examples of the halogen atom contained in the divalent organic group represented by $X^2$ and $X^3$ include chlorine atom and bromine atom, and bromine atom is preferable. Examples of the divalent organic group of $X^2$ and $X^3$ include a group represented by the following formula (4):

In the formulas (4), Z represents chlorine atom or bromine atom, and bromine atom is preferable. n represents an integer of 1 to 4, and 4 is preferable. * represents a bonding hand.

Examples of the halogenated bisimide compound include a compound having a tetrabromophthalimide group, such as 1,2-bis(tetrabromophthalimide)ethane, (that is, ethylene bistetrabromophthalimide), 1,3-bis(tetrabromophthalimide) propane, 1,4-bis(tetrabromophthalimide)butane, bis[2-(tetrabromophthalimide)ethyl]ether, bis[3-(tetrabromophthalimide)propyl]ether, bis[4-(tetrabromophthalimide)butyl] ether, bis [4-(tetrabromophthalimide)phenyl]sulfone and bis [4-(tetrabromophthalimide)phenyl]ketone; a compound having a tetrachlorophthalimide group, such as 1,2-bis(tetrachlorophthalimide)ethane, 1,3-bis(tetrachlorophthalimide)propane, 1,4-bis(tetrachlorophthalimide)butane, bis[2-(tetrachlorophthalimide)ethyl]ether, bis[3-(tetrachlorophthalimide)propyl]ether, bis [4-(tetrachlorophthalimide)butyl]ether, bis [4-(tetrachlorophthalimide)phenyl]sulfone, bis[4-(tetrachlorophthalimide)phenyl]ketone; and the like. Among them, ethylene bistetrabromophthalimide is preferable.

The halogen-containing styrene-based resin means a polymer having repeating units derived from a styrene-based monomer, which includes halogen atom at the main chain and/or the side chain.

Examples of the styrene-based monomer include a monomer including no halogen atom, such as styrene, α-methylstyrene, p-methylstyrene, p-t-butylstyrene and vinylnaphthalene; a monomer including halogen atom, such as monochlorostyrene, dichlorostyrene, trichlorostyrene, monobromostyrene, dibromostyrene and tribromostyrene; and the like.

Examples of the halogen atom included in the halogen-containing styrene-based resin include chlorine atom and bromine atom, and bromine atom is preferable.

The weight average molecular weight (Mw) of the halogen-containing styrene-based resin is not particularly limited, but it is usually 5,000 to 500,000, preferably 10,000 to 500,000, and more preferably 10,000 to 300,000.

Note that the weight average molecular weight (Mw) can be determined as a standard polystyrene-equivalent value by gel permeation chromatography (GPC) measurement.

Among them, ethylene bistetrabromophthalimide is preferable as the flame retardant (α) because of excellent thermal stability.

In the flame-retardant resin composition according to one embodiment of the invention, the flame retardants (α) may be used either alone or in combination.

The content of the flame retardant (α) in the flame-retardant resin composition is 10 to 80 parts by weight, and preferably 15 to 70 parts by weight based on 100 parts by weight of the cycloolefin-based polymer.

A resin composition including an extremely small amount of the flame retardant (α) has poor flame retardance. On the other hand, a resin composition including an extremely large amount of the flame retardant (α) tends to have poor formability.

[Halogen-Active Species Scavenger]

The flame-retardant resin composition according to one embodiment of the invention may include a halogen-active species scavenger.

The phrase "may include a halogen-active species scavenger" means either "includes no halogen-active species scavenger" or "includes a halogen-active species scavenger".

The halogen-active species scavenger has an action for neutralizing hydrogen halide generated when heating the halogen-containing flame retardant. Thus, the corrosion of the die due to hydrogen halide during forming can be suppressed by using the halogen-active species scavenger.

Examples of the halogen-active species scavenger include an inorganic halogen-active species scavenger that is a hydroxide of an alkali metal or an alkali earth metal, such as aluminum hydroxide, magnesium hydroxide and calcium carbonate; an organic halogen-active species scavenger that is a hydroxyl group-containing compound, such as polyhydric alcohol having 4 or more hydroxyl groups, phenol and pentaerythritol; and the like.

Among them, the inorganic halogen-active species scavenger is preferable because a resin formed article having excellent heat resistance is obtained.

In the flame-retardant resin composition according to one embodiment of the invention, the halogen-active species scavengers may be used either alone or in combination.

The content of the halogen-active species scavenger in the flame-retardant resin composition is less than 25 parts by weight, preferably less than 15 parts by weight based on 100 parts by weight of the flame retardant (α). Since the halogen-active species scavenger tends to increase the dielectric constant and the dielectric loss tangent of the resin composition, a flame-retardant resin composition having low dielectric constant and low dielectric loss tangent can be easily obtained by reducing the content of the halogen-active species scavenger.

[Flame-Retardant Promoter]

The flame-retardant resin composition according to one embodiment of the invention may include a flame-retardant promoter.

The flame-retardant promoter is a compound which enhances the flame retardance of the flame-retardant resin composition by interaction with the flame retardant (α). Examples of the flame-retardant promoter include red phosphorus, boron trichloride, antimony trioxide, antimony pentoxide, zinc borate, and the like.

Among them, an antimony compound such as antimony trioxide and antimony pentoxide is preferable because a resin composition having more excellent flame retardance can be obtained.

In the flame-retardant resin composition according to one embodiment of the invention, the flame-retardant promoters may be used either alone or in combination.

When the flame-retardant resin composition according to one embodiment of the invention includes a flame-retardant promoter, the content of the flame-retardant promoter in the flame-retardant resin composition is normally 1 to 30 parts by weight, and preferably 3 to 10 parts by weight based on 100 parts by weight of the cycloolefin-based polymer.

[Drip-Preventing Agent]

The flame-retardant resin composition according to one embodiment of the invention may include a drip-preventing agent.

The drip-preventing agent is a compound that prevents droplets from dripping during combustion by using the flame retardant (α) in combination to enhance the flame retardance of the flame-retardant resin composition. Examples of the drip-preventing agent include a phenol-based resin, a silicone resin, a fluorine-based resin, and the like.

Among then, a fluorine-based resin is preferable because of a high drip-preventing effect. Examples of the fluorine-based resin include polytetrafluoroethylene, polyhexafluoropropylene, (tetrafluoroethylene/hexafluoropropylene) copolymer, (tetrafluoroethylene/perfluoroalkylvinyl ether) copolymer, (tetrafluoroethylene/ethylene) copolymer, (hexafluoropolypropylene/propylene) copolymer, polyvinylidene fluoride, (vinylidene fluoride/ethylene) copolymer, and the like. Among them, polytetrafluoroethylene and (tetrafluoroethylene/ethylene) copolymer are preferable.

When the flame-retardant resin composition according to one embodiment of the invention includes a drip-preventing agent, the content of the drip-preventing agent in the flame-retardant resin composition is normally 0.05 to 10 parts by weight, and preferably 0.1 to 3 parts by weight based on 100 parts by weight of the cycloolefin-based polymer.

[Other Components]

The flame-retardant resin composition of the present invention may include other known additives unless the effects according to one embodiment of the invention are impaired.

Examples of such additives include a filler, an antioxidant, a release agent, a flame retardant other than the above-described halogen-containing flame retardant, an antimicrobial agent, a coupling agent, a plasticizer, a colorant, a lubricant, a silicone oil, a foaming agent, a surfactant, a light stabilizer, a dispersing agent, a dispersing aid, a heat stabilizer, an ultraviolet absorber, an antistatic agent, a crystallization nucleating agent, an antifogging agent, a neutralizer, a decomposer, a metal deactivator, an antifouling agent, a thermoplastic elastomer, a fibrous reinforcing material (glass fiber, carbon fiber, synthetic fiber, ceramic fiber and whisker), a plate reinforcing material (mica, talc, clay and glass flake), a granular reinforcing material (metal oxide, carbonate, sulfate, glass beads, carbon black), and the like. These additives may be used either alone or in combination.

The contents of these additives are not particularly limited, and may be appropriately determined depending on the purpose for the addition unless the effects according to one embodiment of the invention are impaired.

[Flame-Retardant Resin Composition]

The method for producing the flame-retardant resin composition according to one embodiment of the invention is not particularly limited, and a known method can be used. The flame-retardant resin composition according to one embodiment of the invention can be obtained by mixing e.g. the cycloolefin-based polymer, the flame retardant (α), and other additives blended as required.

The mixing method is not particularly limited as long as each component is sufficiently mixed. Examples of the mixing method include a method in which a resin in a molten state is kneaded by a mixer, a twin-screw kneader or the like, a method in which a resin is dissolved and dispersed in a suitable solvent to solidify the resin, a casting method, or a method in which a solvent is removed by a direct drying, and the like. Among them, the method in which the resin in a molten state is kneaded, is preferable when a hydrogenated crystalline cycloolefin-based ring-opening polymer is used, because a sufficiently mixed flame-retardant resin composition can be easily obtained.

When kneading the resin in a molten state, it is preferable that the resin is kneaded at normally within the temperature range of 260 to 340° C., preferably 265 to 320° C., and more preferably 270 to 300° C. When the temperature is too low, the viscosity is increased, resulting difficulty in kneading, and when the temperature is too high, the cycloolefin-based polymer and other components easily deteriorate.

After kneading, the resin in a molten state may be extruded into a bar shape, and cut into appropriate lengths by a strand cutter to obtain pellets of the flame-retardant resin composition.

The flame-retardant resin composition according to one embodiment of the invention has excellent flame retardance. The grade of the flame-retardant resin composition according to one embodiment of the invention is preferably V-0 grade or higher when determined by an inflammability test based on UL94.

The flame-retardant resin composition according to one embodiment of the invention has low dielectric constant and low dielectric loss tangent. The dielectric constant of the flame-retardant resin composition according to one embodiment of the invention at a frequency of 1 GHz is preferably 3.0 or lower, and more preferably 2.7 or lower.

In addition, the dielectric loss tangent of the flame-retardant resin composition according to one embodiment of the invention at a frequency of 1 GHz is preferably lower than $5.0 \times 10^{-3}$, more preferably lower than $1.0 \times 10^{-3}$, and even more preferably $0.8 \times 10^{-3}$ or lower.

A flame-retardant resin composition having low dielectric constant and low dielectric loss tangent can be efficiently obtained by selecting a cycloolefin-based polymer as a polymer component and decreasing the content of the halogen-active species scavenger in the resin composition. From this viewpoint, the content of the halogen-active species scavenger is preferably 15 parts by weight or less, and more preferably 10 parts by weight or less based on 100 parts by weight of the cycloolefin-based polymer.

2) Resin Formed Article

The resin formed article according to one embodiment of the invention is produced by forming the flame-retardant resin composition of the present invention.

The forming method is not particularly limited, and a known forming method such as an injection forming method, a compression forming method and an extrusion forming method can be used.

The resin formed article according to one embodiment of the invention is not particularly limited, but can be used as a coating material for a transmission cable (a plastic insulated wire, a power cable, a local/toll cable, an office cable, a broad-band cable, a high frequency coaxial cable, a high frequency coaxial (tube) supply wire and elliptical waveguide, a communication wire, a cable, etc.); a general circuit board (a rigid printed board, a flexible printed board, a multilayer printed wiring board, etc.); a high frequency circuit board (a circuit board for a satellite communication equipment, etc.); an automobile exterior part (a bonnet, a trunk door, a door, a fender, a grill, etc.); an engine part such as an air intake and an engine cover; a vehicle lighting part such as a headlamp chassis, a rearlamp chassis, a reflector and an extension reflector; an automobile interior part such as an instrument panel and a seat chassis; an automotive part such as an automotive motor case, a sensor case, a module part case and a fuel cell stack separator; a bicycle part such as a power-assisted battery part; a robot part chassis such as a power assist, an industrial robot and an electric wheelchair part; an aircraft interior part; a part of a ship hull; a household electrical appliance part such as a television, a refrigerator, an air conditioner, a fan, a humidifier, a dehumidifier, a dry washing machine, a dishwasher, a microwave oven, a rice cooker, an electric jar pot and a dryer; a chassis for an electronics product such as a personal computer, a printer, a copier, a telephone, a facsimile, an audio equipment, a camera, a game machine, a hard disk drive, a mobile phone and a smartphone; an electronic part such as a connector, a relay, a condenser, a sensor, an antenna, an IC tray, a chassis, a coil sealing, a motor case and a power source box; a light source lighting appliance for a backlight of a liquid-crystal display in a large-sized liquid crystal display device; a light source lighting appliance for a backlight of a liquid-crystal display in a small-sized electronic device such as a mobile phone, a smartphone and a tablet; a reflector of LED used as a light source of an electric light display board such as a traffic sign display board; an optical lens barrel; a release film for laminating printed wiring board; a substrate for solar cell; a film for wrapping or packaging; an LED molding material; a housing accommodation such as a pump casing, an impeller, a piping joint, a bath tubs, a septic tank, a bathroom panel, an exterior panel, a window sash rail, a window heat insulator and a wash bowl; and an industrial part such as an infusion container, a drug solution layer, a drug solution piping, a gas piping, a container, a pallet and a rack column, because the properties of the flame-retardant resin composition according to one embodiment of the invention can be sufficiently exploited.

EXAMPLES

The present invention is further described below by way of examples. Note that the present invention is not limited to the following examples. Further, the units "parts" and "%" used in connection with the following examples and the comparative examples respectively refer to "parts by weight" and "wt %" unless otherwise indicated.

Methods for evaluating each property are as below.

(1) Molecular Weight of Polymer (Weight Average Molecular Weight and Number Average Molecular Weight)

Gel permeation chromatography (GPC) using tetrahydrofuran as a developing solvent (apparatus: HLC-8320 manufactured by Tosoh Corporation, column: H-type column manufactured by Tosoh Corporation) was carried out at 40° C. to determine the molecular weight of the polymer as a standard polystyrene-equivalent value.

(2) Hydrogenation Ratio in Hydrogenation Reaction

The hydrogenation ratio of the cycloolefin-based polymer in hydrogenation reaction was determined by $^1$H-NMR measurement.

(3) Melting Point of the Cycloolefin-Based Polymer

For the cycloolefin-based polymer, the glass transition temperature and the melting point were respectively determined using a differential scanning calorimeter. In the measurement, a sample was heated to 300° C. under a nitrogen atmosphere, then rapidly cooled with liquid nitrogen, and heated at a rate of 10° C./minute again.

(4) Ratio of Racemo Diads in the Cycloolefin-Based Polymer

For the cycloolefin-based polymer, $^{13}$C-NMR measurement was carried out at 200° C. using a mixed solvent of 1,2,4-trichlorobenzene-d3/orthodichlorobenzene-d4 (volume ratio: 2/1) as a solvent to determine a ratio of the racemo diads in the cycloolefin-based polymer on the basis of the intensity ratio of a signal at 43.35 ppm attributed to the meso diads and a signal at 43.43 ppm attributed to racemo diads.

(5) Flame Retardance of the Resin Composition

The pellet obtained in Examples and Comparative Examples was used as a forming material, and injection-formed under the following conditions to prepare a specimen having a thickness of 3.0 mm, a length of 125 mm and a width of 13 mm. Subsequently, this specimen was subjected to an inflammability test based on UL94, and a case where the V-0 grade had been achieved was evaluated as "Good", and a case where the V-0 grade had not been achieved was evaluated as "Bad".

Apparatus: micro-injection forming machine (Micro Injection Moulding Machine 10 cc, Xplore, manufactured by DSM N.V.)

Forming temperature: 280° C.
Injection pressure: 0.7 MPa
Die temperature: 150° C.
Cooling time: 10 seconds (6) Electrical Property of the Resin Composition A specimen having a thickness of 1 mm, a length of 10 mm and a width of 1 mm was prepared under the same forming condition as in the case of the specimen of the flammability test. Subsequently, the dielectric constant and the dielectric loss tangent of this specimen were measured using a network analyzer (product name: "N5230A" manufactured by Agilent Technologies, Inc.) in accordance with ASTM D2520 by a cylindrical cavity resonator method. The measurement frequency was set to 1 GHz.

[Additives]

The utilized additives are as follows.

Halogen-containing flame retardant (1): Ethylenebistetrabromophthalimide (bromination ratio: 67%) (SAYTEX BT-93, manufactured by ALBEMARLE JAPAN CORPORATION)

Halogen-containing flame retardant (2): Brominated polystyrene (bromination ratio: 68%) (SAYTEX HP-7010, manufactured by ALBEMARLE JAPAN CORPORATION)

Flame-retardant promoter (1): Antimony trioxide (PA-TOX-M, manufactured by Nihon Seiko Co., LTD.)

Drip-preventing agent (1): polytetrafluoroethylene (METABLEN A-3750, manufactured by Mitsubishi Rayon Co., Ltd.)

Halogen-active species scavenger (1): Aluminum hydroxide (HIGILITE H-21, manufactured by SHOWA DENKO K.K.)

Fibrous reinforcing material (1): Glass fiber (CSG 3PA-830, manufactured by Nitto boseki Co., Ltd.)

Production Example 1

After drying, 40 parts of cyclohexane solution including 75% of dicyclopentadiene (content of the endo stereoisomer: 99% or more) (amount of the dicyclopentadiene; 30 parts) was put into a glass pressure-resistant reactor whose inside had been replaced by nitrogen, and furthermore 738 parts of cyclohexane and 2.0 parts of 1-hexene were added, and the whole content was heated to 50° C.

On the other hand, 4.6 parts of n-hexane solution including 19% of diethylaluminum ethoxide was added to the solution obtained by dissolving 1.1 parts of tetrachlorotungsten phenylimide (tetrahydrofuran) complex in 56 parts of toluene, and stirred for 10 minutes to prepare a catalyst solution.

This catalyst solution was added to the reactor to initiate ring-opening polymerization reaction. To this solution, 40 parts of cyclohexane solution including 75% of dicyclopentadiene was added 9 times every 5 minutes, and then the reaction was continued for 2 hours, while maintaining the temperature of the solution in the reactor at 50° C. Subsequently, a small amount of isopropanol was added to terminate the reaction, and then the reaction solution was poured into a large amount of isopropanol to coagulate the polymer. The polymer was taken by filtration, washed, and then dried under reduced pressure (0.13×10$^3$ Pa or lower, the same applies to the following.) at 40° C. for 20 hours.

The yield of the polymer was 296 parts (yield=99%). In addition, this polymer had a weight average molecular weight (Mw) of 27,000, and a molecular weight distribution (Mw/Mn) of 1.90.

Subsequently, 60 parts of the resulting polymer and 261 parts of cyclohexane were put into a pressure-resistant reactor, and stirred to dissolve the polymer in cyclohexane. To the resulting solution, a hydrogenation catalyst solution obtained by dissolving 0.039 parts of chlorohydride carbonyltris (triphenylphosphine) ruthenium in 40 parts of toluene was added, and hydrogenated under a hydrogen pressure of 4 MPa at 160° C. for 5 hours. The reaction solution was poured into a large amount of isopropanol to completely precipitate the hydrogenated polymer. The hydrogenated polymer was taken by filtration and washed, and then dried under reduced pressure at 60° C. for 24 hours to obtain a hydrogenated cycloolefin-based ring-opening polymer (A).

The hydrogen conversion ratio in the hydrogenation reaction was 99% or higher. In addition, the ratio of the racemo diads in the hydrogenated cycloolefin-based ring-opening polymer (A) was 89%, and the melting point was 265° C.

Production Example 2

After drying, 700 parts of cyclohexane, 0.89 parts of 1-hexene, 1.06 parts of diisopropyl ether, 0.34 parts of triisobutylaluminum and 0.13 parts of isobutyl alcohol were put into a glass pressure-resistant reactor whose inside had been replaced by nitrogen at room temperature, and then the whole content was heated to 55° C. Subsequently, to this solution, 250 parts of 2-norbornene (2-NB), 1.25 parts of 5-vinyl-2-norbornene and 26 parts of toluene solution including 1.0% of tungsten hexachloride were continuously added for 2 hours while maintaining the temperature of the solution in the reactor at 55° C., for polymerization reaction. A polymerization conversion ratio in this polymerization reaction was approximately 100%.

Subsequently, the resulting reaction mixture was transferred to a pressure-resistant hydrogenation reactor, to which 1.0 part of a diatomaceous earth-carrying nickel catalyst (T8400, nickel-carrying ratio: 58%, manufactured by Süd-Chemie AG) was added, and hydrogenated at a hydrogen pressure of 4.5 MPa at 200° C. for 6 hours. Subsequently, the catalyst was filtered out from the reaction solution using a filter equipped with a stainless-steel mesh (filter aid: diatomaceous earth), and the resulting filtrate was poured into a large amount of isopropanol to precipitate a hydrogenated polymer. The hydrogenated polymer was taken by filtration, washed, and then dried under reduced pressure at 100° C. for 48 hours to obtain hydrogenated cycloolefin-based ring-opening polymer (B).

The hydrogen conversion ratio in the hydrogenation reaction was 99% or higher. In addition, the hydrogenated cycloolefin-based ring-opening polymer (B) had a weight average molecular weight (Mw) of 70,200, a molecular weight distribution (Mw/Mn) of 3.8, and a melting point of 136° C.

Production Example 3

After drying, 300 parts of cyclohexane, 0.5 parts of 1-hexene, 0.15 parts of dibutyl ether, 1.5 parts of cyclohexane solution including 10% of triisobutylaluminum were put into a reactor equipped with a stirrer whose inside had been replaced by nitrogen at room temperature, and then the whole content was heated to 40° C. Subsequently, the whole content was stirred, to which a mixture of 70 parts of tetracyclododecene and 30 parts of dicyclopentadiene, and 11 parts of cyclohexane solution including 0.6% of tungsten hexachloride were continuously added at the same time while maintaining the temperature at 40° C., for polymerization reaction. Subsequently, 0.5 parts of butylglycidyl ether and 0.2 parts of isopropyl alcohol were added into the reactor to terminate the polymerization reaction.

400 parts of the resulting polymerization reaction solution was transferred to a pressure-resistant reactor equipped with a stirrer, to which 4 parts of a diatomaceous earth-carrying nickel catalyst (T8400RL, nickel-carrying ratio: 57%, manufactured by Süd-Chemie AG) was added, and hydrogenated at a hydrogen pressure of 4.5 MPa at 170° C. for 5 hours. Subsequently, the reaction mixture was filtered to remove the hydrogenation catalyst, and then 0.1 parts of pentaerythritol tetrakis[3-(3,5-di-t-butyl-4-hydroxyphenyl) propionate] was added to the filtrate. A volatile component was evaporated from this solution using a thin film evaporator (product name: "Film Truder", manufactured by Buss AG) under the condition of a temperature of 260° C. (533° K), a pressure of 1 kPa or lower and a residence time of 1.2 hours to obtain a hydrogenated cycloolefin-based ring-opening polymer (C) of tetracyclododecene-dicyclopentadiene.

The hydrogen conversion ratio in the hydrogenation reaction was 99% or higher. In addition, the hydrogenated cycloolefin-based ring-opening polymer (C) had a weight average molecular weight (Mw) of 42,000, a molecular weight distribution (Mw/Mn) of 2.30, and a glass transition temperature of 142° C. No melting point was observed.

Production Example 4

23.5 parts of toluene, 0.044 parts of rac-ethylenebis (1-indenyl)zirconium dichloride and 6.22 parts of toluene solution including 9.0 wt % of methylaluminoxane (TMAO-200 series, manufactured by Toso-Finechem Corporation) were mixed in a glass container to prepare a catalyst solution.

Aside from this, after drying, 960 parts of toluene, 220 parts of 1,4-methano-1,4,4a-9a-tetrahydrofluorene and 0.166 parts of 1-hexene are put into a reactor with an inner volume of 1.0 L equipped with a stirrer whose inside had been replaced by nitrogen, and the temperature of the solvent was increased to 40° C. while stirring at 300 to 350 rpm. When the temperature of the solvent in the reactor reached 40° C., the catalyst solution was added to the reactor, and then ethylene gas at 0.08 MPa was immediately introduced into the liquid phase to initiate polymerization. The ethylene-spouting port is positioned so that the ratio (B)/(A) of the distance (A) between the bottom of the reactor and the liquid surface and the distance (B) between the ethylene-spouting port and the liquid surface is 0.60. When ethylene gas was consumed, the pressure of ethylene gas was kept constant by automatically supplying ethylene gas. After 30 minutes, the introduction of ethylene gas was terminated, the reactor was depressurized, to which 5 parts of methanol was then added to terminate the polymerization reaction. This solution was filtered with a filter aid (Radiolite #800, manufactured by SHOWA CHEMICAL INDUSTRY CO., LTD.) and poured into isopropanol including 0.05% of hydrochloric acid to precipitate a polymer. The precipitated polymer was separated, washed, and dried under reduced pressure at 100° C. for 15 hours to obtain a cycloolefin-based addition polymer. The resulting cycloolefin-based addition polymer had a weight average molecular weight (Mw) of 64,400, a molecular weight distribution (Mw/Mn) of 2.00, and a glass transition temperature of 171° C. No melting point was observed.

Example 1

100 parts of the hydrogenated cycloolefin-based ring-opening polymer (A), 30 parts of the halogen-containing flame retardant (1), 5 parts of the flame-retardant promoter (1) and 0.2 parts of the drip-preventing agent (1) were kneaded by a twin-screw kneader to obtain a strand (bar-shaped molten resin), which was then cut with a strand cutter to obtain a resin composition in a pellet form (granular form).

Subsequently, flame retardance and electrical property of the resulting resin composition were examined by the above method. The results are shown in Table 1.

Example 2

A resin composition was obtained in the same way as Example 1 except that the halogen-containing flame retardant (2) was used instead of the halogen-containing flame retardant (1) in Example 1, and its flame retardance and electrical property were examined. The results are shown in Table 1.

Example 3

A resin composition was obtained in the same way as Example 1 except that the hydrogenated cycloolefin-based ring-opening polymer (B) was used instead of the hydrogenated cycloolefin-based ring-opening polymer (A) in Example 1, and its flame retardance and electrical property were examined. The results are shown in Table 1.

Example 4

A resin composition was obtained in the same way as Example 1 except that the amount of the halogen-containing flame retardant (1) to be added was changed to 15 parts based on 100 parts of the hydrogenated cycloolefin-based ring-opening polymer (A) in Example 1, and its flame retardance and electrical property were examined. The results are shown in Table 1.

Example 5

A resin composition was obtained in the same way as Example 1 except that the amount of the halogen-containing flame retardant (1) to be added was changed to 70 parts based on 100 parts of the hydrogenated cycloolefin-based ring-opening polymer (A) in Example 1, and its flame retardance and electrical property were examined. The results are shown in Table 1.

Example 6

A resin composition was obtained in the same way as Example 1 except that the amount of the halogen-containing flame retardant (1) to be added was changed to 60 parts based on 100 parts of the hydrogenated cycloolefin-based ring-opening polymer (A) and furthermore 10 parts of halogen-active species scavenger (1) was added in Example 1, and its flame retardance and electrical property were examined. The results are shown in Table 1.

Example 7

A resin composition was obtained in the same way as Example 1 except that the fibrous reinforcing material (1) was added in Example 1, and its flame retardance and electrical property were examined. The results are shown in Table 1.

Comparative Example 1

A resin composition was obtained in the same way as Example 1 except that the halogen-containing flame retardant (1), the flame-retardant promoter (1) and the drip-preventing agent (1) were not added in Example 1, and its flame retardance and electrical property were examined. The results are shown in Table 2.

Comparative Example 2

A resin composition was obtained in the same way as Example 1 except that the amount of the halogen-containing flame retardant (1) to be added was changed to 5 parts based on 100 parts of the hydrogenated cycloolefin-based ring-opening polymer (A) in Example 1, and its flame retardance and electrical property were examined. The results are shown in Table 2.

Comparative Example 3

100 parts of the hydrogenated cycloolefin-based ring-opening polymer (A), 16 parts of the halogen-containing flame retardant (2), 13 parts of the flame-retardant promoter (1) and 34 parts of the halogen-active species scavenger (1) were kneaded by a twin-screw kneader to obtain a strand (bar-shaped molten resin), which was then cut with a strand cutter to obtain a resin composition in a pellet form (granular form).

Subsequently, flame retardance and electrical property of the resulting resin composition were examined by the above method. The results are shown in Table 2.

Comparative Example 4

100 parts of the hydrogenated cycloolefin-based ring-opening polymer (A), 70 parts of the halogen-containing flame retardant (1), 5 parts of the flame-retardant promoter (1), 0.2 parts of the drip-preventing agent (1) and 30 parts of halogen-active species scavenger (1) were kneaded by a twin-screw kneader to obtain a strand (bar-shaped molten resin), which was then cut with a strand cutter to obtain a resin composition in a pellet form (granular form).

Subsequently, flame retardance and electrical property of the resulting resin composition were examined by the above method. The results are shown in Table 2.

Comparative Example 5

A resin composition was obtained in the same way as Example 1 except that a polyethylene terephthalate resin (TR-8550T1, manufactured by Teijin Limited) was used instead of the hydrogenated cycloolefin-based ring-opening polymer (A) in Example 1, and its flame retardance and electrical property were examined. The results are shown in Table 2.

| | | Example | | | | |
|---|---|---|---|---|---|---|
| | | 1 | 2 | 3 | 4 | 5 |
| Polymer (parts) | Hydrogenated cycloolefin ring-opening polymer (A) | 100 | 100 | — | 100 | 100 |
| | Hydrogenated cycloolefin ring-opening polymer (B) | — | — | 100 | — | — |
| | Hydrogenated cycloolefin ring-opening polymer (C) | — | — | — | — | — |
| | Cycloolefin-based addition polymer | — | — | — | — | — |
| | Polyethylene terephthalate | — | — | — | — | — |
| Additive (parts) | Halogen-containing flame retardant (1) | 30 | — | 30 | 15 | 70 |
| | Halogen-containing flame retardant (2) | — | 30 | — | — | — |
| | Flame-retardant promoter (1) | 5 | 5 | 5 | 5 | 5 |
| | Drip-preventing agent (1) | 0.2 | 0.2 | 0.2 | 0.2 | 0.2 |
| | Halogen-active species scavenger (1) *1 | — | — | — | — | — |
| | Fibrous reinforcing material (1) | 0 | 0 | 0 | 0 | 0 |
| | Flame retardance | Good | Good | Good | Good | Good |
| | Dielectric constant (1 GHz) | 2.1 | 2.1 | 2.2 | 2.1 | 2.1 |
| | Dielectric loss tangent (1 GHz) | 0.0003 | 0.0002 | 0.0002 | 0.0003 | 0.0004 |

| | | Example | |
|---|---|---|---|
| | | 6 | 7 |
| Polymer (parts) | Hydrogenated cycloolefin ring-opening polymer (A) | 100 | 100 |
| | Hydrogenated cycloolefin ring-opening polymer (B) | — | — |
| | Hydrogenated cycloolefin ring-opening polymer (C) | — | — |
| | Cycloolefin-based addition polymer | — | — |
| | Polyethylene terephthalate | — | — |
| Additive (parts) | Halogen-containing flame retardant (1) | 60 | 30 |
| | Halogen-containing flame retardant (2) | — | — |
| | Flame-retardant promoter (1) | 5 | 5 |
| | Drip-preventing agent (1) | 0.2 | 0.2 |
| | Halogen-active species scavenger (1) *1 | 10(17) | — |
| | Fibrous reinforcing material (1) | 0 | 40 |
| | Flame retardance | Good | Good |
| | Dielectric constant (1 GHz) | 2.2 | 2.9 |
| | Dielectric loss tangent (1 GHz) | 0.0008 | 0.00353 |

*1 The value in parentheses is the amount with respect to 100 parts of the halogen-containing flame retardant.

TABLE 2

| | | Comparative Example | | | | |
|---|---|---|---|---|---|---|
| | | 1 | 2 | 3 | 4 | 5 |
| Polymer (parts) | Hydrogenated cycloolefin ring-opening polymer (A) | 100 | 100 | 100 | 100 | — |
| | Hydrogenated cycloolefin ring-opening polymer (B) | — | — | — | — | — |
| | Hydrogenated cycloolefin ring-opening polymer (C) | — | — | — | — | — |
| | Cycloolefin-based addition polymer | — | — | — | — | — |
| | Polyethylene terephthalate | — | — | — | — | 100 |
| Additive (parts) | Halogen-containing flame retardant (1) | — | 5 | — | 70 | 30 |
| | Halogen-containing flame retardant (2) | — | — | 16 | — | — |
| | Flame-retardant promoter (1) | — | 5 | 13 | 5 | 5 |
| | Drip-preventing agent (1) | — | 0.2 | — | 0.2 | 0.2 |
| | Halogen-active species scavenger (1) *1 | — | — | 34 (213) | 30 (43) | — |

TABLE 2-continued

|  | Comparative Example | | | | |
|---|---|---|---|---|---|
|  | 1 | 2 | 3 | 4 | 5 |
| Fibrous reinforcing material (1) | 0 | 0 | 0 | 0 | 0 |
| Flame retardance | Bad | Bad | Good | Good | Good |
| Dielectric constant (1 GHz) | 2.1 | 2.1 | 3.5 | 3.6 | 3.1 |
| Dielectric loss tangent (1 GHz) | 0.0002 | 0.0002 | 0.005 | 0.005 | 0.003 |

*1 The value in parentheses is the amount with respect to 100 parts of the halogen-containing flame retardant.

The following results were confirmed from Table 1.

The resin compositions of Examples 1 to 7 were evaluated as the V-0 grade in the inflammability test based on UL 94, and had excellent flame retardance. In addition, all of the resin compositions of Examples 1 to 7 had low dielectric constant and low dielectric loss tangent and excellent electrical property.

On the other hand, the resin compositions of Comparative Examples 1 and 2 did not meet the V-0 grade in the inflammability test based on Flame Retardant Standard UL 94.

In addition, although the resin compositions of Comparative Examples 3 to 5 had excellent flame retardance, all of them had high dielectric constant and high dielectric loss tangent, and poor electrical property.

The invention claimed is:

1. A flame-retardant resin composition comprising a cycloolefin-based polymer and a halogen-containing flame retardant selected from a group consisting of a halogenated bisimide compound and a halogen-containing styrene-based resin, and optionally comprising a halogen-active species scavenger, wherein the cycloolefin-based polymer is a hydrogenated product of a crystalline cycloolefin-based ring-opening polymer, the halogen-active species scavenger is an inorganic halogen-active species scavenger, a content of the halogen-containing flame retardant is 10 to 80 parts by weight based on 100 parts by weight of the hydrogenated product of the crystalline cycloolefin-based polymer, and a content of the inorganic halogen-active species scavenger is less than 25 parts by weight based on 100 parts by weight of the halogen-containing flame retardant.

2. The flame-retardant resin composition according to claim 1, wherein a dielectric constant is 3.0 or lower, and a dielectric loss tangent is lower than $5.0 \times 10^{-3}$, at a frequency of 1 GHz.

3. The flame-retardant resin composition according to claim 1, wherein a dielectric constant is 3.0 or lower, and a dielectric loss tangent is lower than $1.0 \times 10^{-3}$, at a frequency of 1 GHz.

4. A resin formed article produced by forming the flame-retardant resin composition according to claim 1.

5. The flame-retardant resin composition according to claim 1, wherein a ratio of a racemo diads in the hydrogenated product of the crystalline cycloolefin-based ring-opening polymer is 88 to 99%.

* * * * *